No. 609,297. Patented Aug. 16, 1898.
S. ROSS.
HORSE COLLAR SHAPING MACHINE.
(Application filed June 1, 1897.)
(No Model.)
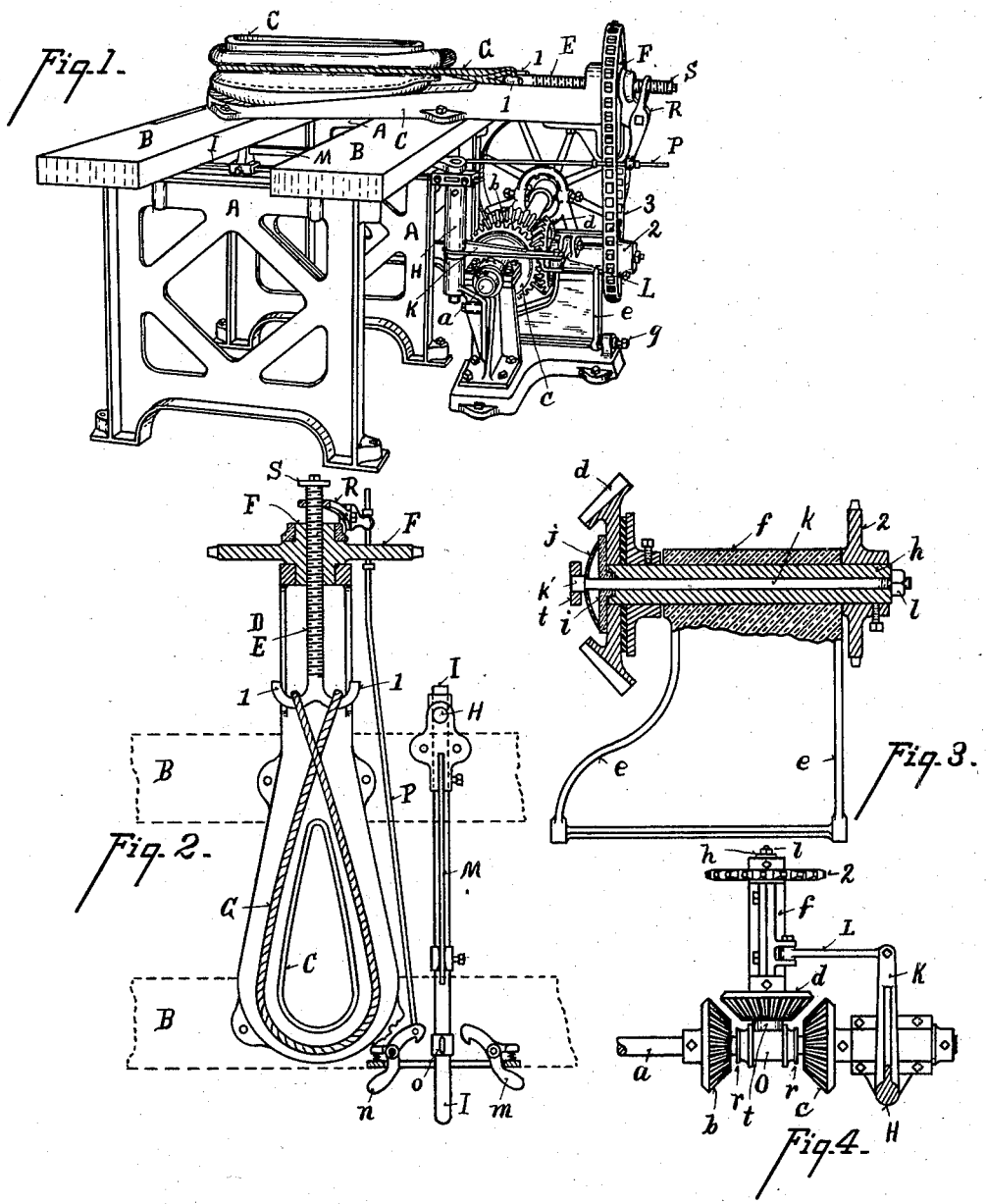
Witnesses
C. W. Miles
Oliver B. Kaiser
Inventor
Simon Ross
by Wood & Boyd
Attorneys

UNITED STATES PATENT OFFICE.

SIMON ROSS, OF CINCINNATI, OHIO.

HORSE-COLLAR-SHAPING MACHINE.

SPECIFICATION forming part of Letters Patent No. 609,297, dated August 16, 1898.

Application filed June 1, 1897. Serial No. 638,993. (No model.)

*To all whom it may concern:*

Be it known that I, SIMON ROSS, residing at Cincinnati, in the county of Hamilton and State of Ohio, have invented certain new and useful Improvements in Horse-Collar-Shaping Machines, of which the following is a specification.

The object of my invention is to provide a horse-collar-shaping machine with power devices for driving the traveling draw-head so constructed that the predetermined amount of strain applied to the draw-head will be automatically produced and automatically maintained without any attention of the operator other than simply starting the machine.

Another object of my invention is to provide reversing mechanism for releasing the strain from the collar so constructed that the reversing-transmitter will be automatically thrown out of gear at the end of the reverse movement of the transmitter without any attention from the operator except to move the reversing-lever for starting the operation.

Another object of my invention is to so arrange the power-transmitting device of the machine that while the predetermined strain can be maintained continuously for any desired length of time the main shaft, which produces this strain, can likewise be employed in driving additional machines, each of the machines being independent of the other in its operation. This is an important advantage, as any number of machines may be mounted side by side and operated by a single line of shafting and controlled by one operator, because the power of each machine is automatically unshipped when the desired degree of tension is attained and the draw-head maintained under such tension. Each machine may therefore be put in operation, maintained under a predetermined tension, or reversed independent of every other machine.

Various other features of my invention are more fully set forth in the description of the accompanying drawings, making a part of this specification, in which—

Figure 1 is a perspective view of the machine in position for use. Fig. 2 is a top plan view, partly in section. Fig. 3 is a central vertical section of the friction releasing mechanism. Fig. 4 is a top plan view of the power driving mechanism.

A A represent the frame-pieces of the machine; B B, the table supported thereon.

C represents the form around which the collar is stretched.

$a$ represents the driving-shaft. Upon this are mounted right and left hand gears $b$ $c$.

$d$ represents a bevel-gear adapted to be engaged, respectively, with gear $b$ or $c$ to drive in either direction. To accomplish this result, the following construction is preferably employed: $e$ $e$ represent a frame on which the sleeve $f$ is mounted. This frame rocks on centers $g$. $h$ represents the power-shaft on which bevel-gear $d$ is mounted. Said bevel-gear $d$ is connected to its shaft by a friction-clutch, which clutch is composed of the plain disk $i$ and the concave spring-disk $j$, which is made of steel. $k$ represents a straining-rod provided with a head $k'$. $l$ represents a nut on the end of said rod $k$ for regulating the tension of the friction-disk $j$. D represents the straining mechanism, which is composed of a reciprocating draw-head, preferably mounted upon an alternately-reciprocating screw-shaft E. 2 represents a sprocket-wheel mounted upon and driven by shaft $h$. 3 represents a chain connecting said sprocket-wheel with a revolving nut F to drive the same. The axis of said nut F has female threads engaging with the screw-shaft E to drive the same in either direction, thereby imparting strain to the collar or releasing it therefrom.

The shipping mechanism for controlling the reversing-gear is constructed as follows: H represents a vertical shaft operated by the setting-lever I. K represents a lever connected to the vertical rock-shaft H. L represents a connecting-rod pivoted thereto and to the sleeve $f$. M represents a spring for normally holding the setting-lever I in a central position, thus holding the gear $d$ normally out of engagement with gears $b$ $c$, as in the position shown in Fig. 4. $m$ $n$ represent hooks adapted to engage the catch $o$ on the setting-lever I for holding the gear $d$ in mesh with either gear $b$ or $c$, as desired. In order that the gear $d$ may not make too close an engagement with gear $b$ or $c$, I provide a sleeve O, having shoulders $r\ r$, engaging with the friction-roll $t$, journaled on the head $k'$, so that the sleeve O moves on shaft $a$ in unison with the gear $d$. The ends of said sleeve O abut the inner face of gears $b\ c$, respectively, and limit the mesh of the teeth of gear $d$ with the gears $b$ or $c$, thereby rendering their disengagement comparatively easy. In order that the gear may be automatically released on the return movement of the straining-shaft, I provide a tripping mechanism which consists of the rod P, hinged to catch $n$ and to the trip-lever R, which is thrown by the head S on screw-shaft E.

Mode of operation: The gear-wheels normally occupy the position shown in Fig. 4, in which the gears $b\ c$ are running as idlers, the screw-shaft E occupying the farthest position inward, so that the rope G may engage with the hame-recess of the collar, which is placed around the form-block C. This collar-form is of the usual construction employed in hand stretching-machines. Shipping-lever I, when moved to the right, brings bevel $d$ into engagement with bevel $b$, which drives the revolving nut F in the direction to drive the screw-shaft E outward, thus drawing the cross-rope G and stretching the collar up to the form-block. The nut $l$ is turned so as to give the requisite amount of tension or compression to the friction-disk $j$, at which point the gear will slip and cease to revolve and the strain applied to the collar by the rope will remain constant until released by the reversing drive. This is accomplished by moving lever I out of engagement with the catch $m$ into engagement with catch $n$, thus bringing bevel $d$ into engagement with bevel $c$, which will drive the revolving nut F in the direction to retract the straining screw-shaft E, which as it arrives at the desired limit of movement inward automatically trips the power shipping mechanism by the engagement of the head S with the lever R and tripping-rod P, releasing the hook $n$, when the spring $m$ will move the shipping-lever I into the position shown in Fig. 2 and the bevel-gear $d$ into the position shown in Fig. 4. Thus the power is automatically controlled by the friction-clutch on the outward movement of the straining-shaft and by the tripping mechanism on the inward movement of the straining-shaft. This is a very material advantage, as a single operator can operate several machines receiving power from a single main shaft, all the attention necessary being to move the shipping-lever and to put on and take off collars. I believe I am the first to accomplish this result.

Having described my invention, what I claim is—

1. In a collar-shaping machine employing a stationary forming-block and traveling draw-head, the combination of an operating device for the draw-head, a power-shaft and connections between said draw-head-operating device and said power-shaft, whereby a predetermined pressure on the collar can be automatically reached and thereafter maintained irrespective of the continued rotation of the power-shaft, substantially as specified.

2. In a horse-collar-shaping machine employing a stationary forming-block and a traveling draw-head, in combination with a power-shaft, an operating device for the draw-head connected thereto and to said power-shaft, the said operating device comprising mechanism adapted to transmit a predetermined pressure to the draw-head and thereafter automatically maintain the same under said pressure irrespective of the continued rotation of the power-shaft, substantially as specified.

3. In combination with a power-shaft and its connections, one or more collar-shaping machines, each employing a stationary forming-block and a traveling draw-head, a draw-head-operating device and power-transmitting devices connecting said power-shaft and said draw-head-operating device adapted to automatically transmit a predetermined pressure to the collar and thereafter automatically maintain said pressure irrespective of the continued rotation of the power-shaft, substantially as specified.

4. In combination with a power-shaft, a right and left hand transmitter mounted thereon, a collar-shaping machine employing a stationary forming-block and a traveling draw-head, an operating device for the draw-head, power-transmitting mechanism connected thereto and adapted to be engaged with either of said transmitters mounted on the power-shaft, a friction-clutch connecting one of the members of said transmitting mechanism to its shaft whereby a predetermined pressure on the collar can be automatically produced and thereafter maintained, irrespective of the continued rotation of the power-shaft, substantially as specified.

5. In combination with a power-shaft and right and left hand transmitters mounted thereon, one or more collar-shaping machines, each employing a stationary forming-block with a traveling draw-head, an operating device for the draw-head, and transmitting mechanism comprising a friction-clutch connection between said draw-head-operating device and said power-shaft adapted to be engaged with either a right or left hand transmitter mounted on said power-shaft, whereby a predetermined pressure on the collars can be automatically reached and thereafter maintained irrespective of the continued rotation of the power-shaft, substantially as specified.

6. In a collar-shaping machine employing a stationary forming-block and traveling draw-head, the combination of an operating device for the draw-head, a power-shaft and a friction-clutch connection applied to one of the transmitters between said draw-head-operating device and said power-shaft, whereby a predetermined pressure on the collar can be automatically reached and thereafter maintained irrespective of the continued rotation of the power-shaft, substantially as specified.

7. In a collar-shaping machine employing a stationary forming-block and a traveling draw-head, the combination of a draw-head-operating device, a movable power-transmitter connected thereto and adapted to be engaged with a right or left hand transmitter mounted on a power-shaft, a friction-clutch connecting one of the members of said movable power-transmitter to its shaft, whereby a predetermined strain can be imparted to the collar and thereafter automatically maintained irrespective of the continued rotation of the power-shaft, substantially as specified.

8. In a collar-shaping machine, in combination with a power-shaft, a traveling draw-head, a forming-block, power-transmitting mechanism operating said draw-head, means for throwing one of the transmitter members into engagement with either a direct or a reverse driving-gear mounted on the power-shaft, tripping and lever mechanism connected to said transmitter and adapted automatically to ship the same out of engagement with a reversing-gear at a given point of the reverse travel of the draw-head, substantially as specified.

9. In a collar-shaping machine, in combination with a power-shaft, a traveling draw-head, a movable power-transmitter connected to and operating said draw-head, a right and left hand transmitter mounted on said shaft, means for throwing said power-transmitter into engagement with either one of said transmitters, and a friction-clutch mechanism interposed between said power-shaft and the draw-head, whereby a predetermined pressure on the collar can be automatically reached and thereafter maintained irrespective of the continued rotation of the power-shaft, substantially as specified.

10. In a collar-shaping machine, the combination of a traveling draw-head, with power-driven mechanism consisting of a movable power-transmitter adapted to be engaged with either a driving or a reversing gear mounted on the driving-shaft, means for holding it normally out of engagement, a friction-clutch member connecting one of the power-transmitters to its shaft, and means for regulating the tension of said friction-clutch, substantially as specified.

11. In a horse-collar-shaping machine employing a traveling draw-head, a power-shaft, a right and left hand gear mounted thereon, a movable transmitting-gear, means for holding said gear normally between said gears on the power-shaft, transmitters connected to said movable gear operating said draw-head, a friction-clutch connecting one of said transmitting members with its shaft, a shipping-lever adapted to operate the movable transmitter, and tripping mechanism connecting the draw-head shaft with a catch engaging the shipping-lever, whereby the movable gear is automatically unshipped at one of the extreme movements of the draw-head, substantially as specified.

In testimony whereof I have hereunto set my hand.

SIMON ROSS.

Witnesses:
W. R. WOOD,
OLIVER B. KAISER.